US008750676B2

(12) United States Patent
Aoki (10) Patent No.: US 8,750,676 B2
(45) Date of Patent: Jun. 10, 2014

(54) CONTENT STORAGE SYSTEM, STORAGE APPARATUS FOR USE IN THE SYSTEM, AND METHOD OF CONTROLLING STORAGE OF CONTENTS

(75) Inventor: Toshiaki Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1645 days.

(21) Appl. No.: 11/826,920

(22) Filed: Jul. 19, 2007

(65) Prior Publication Data

US 2008/0031594 A1 Feb. 7, 2008

(30) Foreign Application Priority Data

Jul. 20, 2006 (JP) .................................. 2006-198460
Jul. 24, 2006 (JP) .................................. 2006-201204
Jul. 17, 2007 (JP) .................................. 2007-185741

(51) Int. Cl.
*H04N 5/92* (2006.01)

(52) U.S. Cl.
USPC .......................................................... 386/241

(58) Field of Classification Search
USPC .................................................. 386/230–235
See application file for complete search history.

(56) References Cited

U.S. PATENT DOCUMENTS

| 6,937,540 | B1 * | 8/2005 | Kikuchi et al. | ............. | 369/30.03 |
| 2003/0081131 | A1 * | 5/2003 | Farnan et al. | ............. | 348/211.11 |
| 2003/0206635 | A1 * | 11/2003 | Morley et al. | .................. | 380/269 |
| 2003/0233663 | A1 * | 12/2003 | Rao et al. | ....................... | 725/131 |
| 2006/0136624 | A1 * | 6/2006 | Takano | ............................ | 710/62 |

FOREIGN PATENT DOCUMENTS

| JP | 5-210909 | 8/1993 |
| JP | 9-294243 | 11/1997 |
| JP | 2002-352487 | 12/2002 |

* cited by examiner

*Primary Examiner* — Thai Tran
*Assistant Examiner* — William Tran
(74) *Attorney, Agent, or Firm* — Finnegan, Henderson, Farabow, Garrett & Dunner, LLP (57) ABSTRACT

The first video server encodes the content played back from a VTR/DVD, thus generating encoded data. The encoded data is read from the first video server and copied in the second video server. The data thus copied is further copied in the third video server. Then, the encoded data is similarly copied in other video servers, the last one being the video server. Thus, the same content is stored in all video servers. The decoded content is output from the last video server and supplied to a video-audio monitor through a switcher. At the video-audio monitor, the content is previewed. Hence, whether the data items stored in all video servers contains errors can be determined by previewing them only once at the video-audio monitor.

15 Claims, 8 Drawing Sheets

Table T

| Content | ABN1 | | |
|---|---|---|---|
| | Video server | | |
| 0 System | 31 | Input | VTR/DVD |
| | | Output | 32 |
| | | Monitor | |
| 1 System | 32 | Input | 31 |
| | | Output | 33 |
| | | Monitor | |
| 2 System | 33 | Input | 32 |
| | | Output | NA |
| | | Monitor | * |

FIG. 4

Table T

| Content | ABN1 | | |
|---|---|---|---|
| | Video server | | |
| 0 System | 31 | Input | VTR/DVD |
| | | Output | 32 |
| | | Monitor | |
| | | Mode | CS |
| 1 System | 32 | Input | 31 |
| | | Output | 33 |
| | | Monitor | |
| | | Mode | WS |
| 2 System | 33 | Input | 32 |
| | | Output | NA |
| | | Monitor | * |
| | | Mode | WR |

CONTENT STORAGE SYSTEM, STORAGE APPARATUS FOR USE IN THE SYSTEM, AND METHOD OF CONTROLLING STORAGE OF CONTENTS

CROSS-REFERENCE TO RELATED APPLICATIONS

This application is based upon and claims the benefit of priority from prior Japanese Patent Applications No. 2006-198460, filed Jul. 20, 2006; No. 2006-201204, filed Jul. 24, 2006; and No. 2007-185741, filed Jul. 17, 2007, the entire contents of all of which are incorporated herein by reference.

BACKGROUND OF THE INVENTION

1. Field of the Invention

The present invention relates to a content storage system that encodes content such as video signals and audio signals to be used in, for example, broadcasting stations to broadcast programs, and stores this content in a plurality of storage apparatuses, a storage apparatus for use in the system, and a method of controlling the storage of content.

2. Description of the Related Art

The broadcast-program on-air system used in any broadcasting station has video servers (storage apparatuses). Each video server encodes and stores content, such as video signals and audio signals to be used in the programs. In response to an on-air request for a program, the video server decodes the content. The content decoded is read from the video server and transmitted. To respond the on-air request reliably, two video servers, i.e., an acting video server and a reserve video server, are operated in parallel. If any trouble develops in the acting video server, the output is instantly switched from the output of the acting video server to the output of the reserve video server. In some cases, another reserve video server may be used, whereby three video servers operate are operated at the same time.

The video servers used in the broadcast-program on-air system described above are operated in parallel receives the same content, encode the content and store the content encoded, in order to transmit the same stored content in accordance with the schedule of broadcasting programs. Two methods are available for storing the same content into a plurality of video servers. In one method, the same content is input to the video servers at the same time, or in parallel. In the other method, the video servers are connected to the source of the content, one after another, so that the content may be stored in one server at a time.

In order to copy the data files of content, such as video data, in a plurality of storage apparatuses such as video servers, a plurality of playback heads may read the same content from a recording medium and the content thus read may be stored in the storage apparatuses (e.g., video severs) at the same time. (See, for example, Jpn. Pat. Appln. KOKAI Publication No. 5-210909, page 5 and FIG. 1.)

Any video server used in the broadcasting station should be so designed that no video data containing noise resulting from errors made during the storage is broadcast and played back. In many cases, the video and audio signals stored in the video servers are data, such as Moving Picture Experts Group (MPEG) data, which have been compressed and encoded to content data for broadcasting. If the compressed and encoded data stored in the video servers contains an error, which may be only a one-bit error, the decoding of the compressed codes will be much influenced, greatly impairing the quality of image played back.

With a data storage apparatus of the ordinary type, it suffices to compare the digital data input to it with the digital data output from it, thereby to confirm that the input data and the output data are identical to each other. In any video server used in the broadcasting station, however, the process of storing data involves the above-mentioned conceding. Therefore, not only the stored data, but also the data encoded and the data decoded must be checked and confirmed. In other words, all signals decoded in each video server, which will be broadcast, should be monitored to determine whether they can be converted to images and sounds similar to the original images and sound.

Thus, the data stored in each video server is previewed to see whether the data has no errors, or whether the data has quality high enough to be broadcast. The greater the number of video servers used, which operates in parallel with the acting video server, the longer the time that must be spent in previewing the data in the video servers, as long as the data (i.e., content) remains stored in all video servers. In addition, the working load on the operators who preview the video servers will inevitably increase.

As described above, with the content storage system used in, for example, any broadcasting station, the data accumulated in the storage apparatuses operating in parallel must be previewed again and again as long as the data remains stored in the storage apparatuses. Much time is required to preview the content in the storage apparatuses, and the working load is large on the part of the operators who preview the data.

BRIEF SUMMARY OF THE INVENTION

An object of the present invention is to provide a content storage system, in which the content stored in all storage apparatuses can be previewed at a time even if the content is identical, and errors, if any, can therefore be detected within a short time. Another object of the invention is to provide a storage apparatus for use in this system and a method of controlling the storage of content.

A content storage system according to the present invention is characterized by comprising: first to Nth storage apparatuses (N is 2 or a greater natural number), each of which is configured to store content containing at least any one of a video signal and an audio signal; a monitor apparatus which previews the content stored in each of the first to Nth storage apparatuses; and a control apparatus which controls the data storage in each of the first to Nth storage apparatuses and the processing of preview outputs of the monitor apparatus, wherein each of the first to Nth storage apparatuses comprises: an encoding unit which receives and encodes the content; a memory unit into which encoded data obtained by the encoding unit is written; a decoding unit which decodes the encoded data read from the memory unit, back to the original content; and an input-output unit which receives data from outside, writes the data to the memory unit, reads the data from the memory unit and outputs the data outside, the input-output units of the first to Nth storage apparatuses are connected in series, the control apparatus causes the first storage apparatus to receive the content and causes the memory unit of the first storage apparatus to store the encoded data generated by the encoding unit of the first storage apparatus, the control apparatus causes the ith storage apparatus (i is any one of natural numbers 1 to N−1) to output the encoded data from the memory unit of the ith storage apparatus to the input-output unit thereof, the control apparatus causes the (i+1)th storage apparatus to receive the encoded data from the ith storage apparatus and to write the encoded data to the memory unit of the (i+1)th storage apparatus, thereby copying and storing the encoded data, the control apparatus causes the Nth storage apparatus to read the encoded data from the memory unit of the Nth storage apparatus and causes the decoding unit of the Nth storage apparatus to decode the encoded data back to the original content, and the control apparatus causes the monitor apparatus to preview the content output from the Nth storage apparatus.

A storage apparatus for use in a content storage system that comprises first to Nth storage apparatuses (N is 2 or a greater natural number), each of which is configured to store content containing at least any one of a video signal and an audio signal, a monitor apparatus which previews the content stored in each of the first to Nth storage apparatuses, and a control apparatus which controls the data storage in each of the first to Nth storage apparatuses and the processing of preview outputs of the monitor apparatus, the storage apparatus according to the present invention is characterized by comprising: an encoding unit which receives and encodes the content; a memory unit into which encoded data obtained by the encoding unit is written; a decoding unit which decodes the encoded data read from the memory unit, back to the original content; and an input-output unit which receives data from outside, writes the data to the memory unit, reads the data from the memory unit and outputs the data outside, and which is connected in series to the input-output unit of the next-stage storage apparatus provided in the content storage system.

A method of controlling storage of content in a content storage system, according to the present invention, is characterized by comprising first to Nth storage apparatuses (N is 2 or a greater natural number), each of which is configured to store content containing at least any one of a video signal and an audio signal and monitor apparatus which previews the content stored in each of the first to Nth storage apparatuses, each of the first to Nth storage apparatuses comprising an encoding unit which receives and encodes the content, a memory unit into which encoded data obtained by the encoding unit is written, a decoding unit which decodes the encoded data read from the memory unit, back to the original content, and an input-output unit which receives data from outside, writes the data to the memory unit, reads the data from the memory unit and outputs the data outside, the input-output units of the first to Nth storage apparatuses being connected in series, the method comprising: causing the first storage apparatus to receive the content and causing the memory unit to store the encoded data generated by the encoding unit, in the memory unit; causing the ith storage apparatus (i is any one of natural numbers 1 to N−1) to output the encoded data from the memory unit to the input-output unit; causing the (i+1)th storage apparatus to receive, at the input-output unit, the encoded data from the ith storage apparatus and to write the encoded data to the memory unit, thereby copying and storing the encoded data; causing the Nth storage apparatus to read the encoded data from the memory unit and causing the decoding unit to decode the encoded data back to the original content, and causing the monitor apparatus to preview the content output from the Nth storage apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of this invention will be described with reference to the accompanying drawings.

First Embodiment

Figure 1:
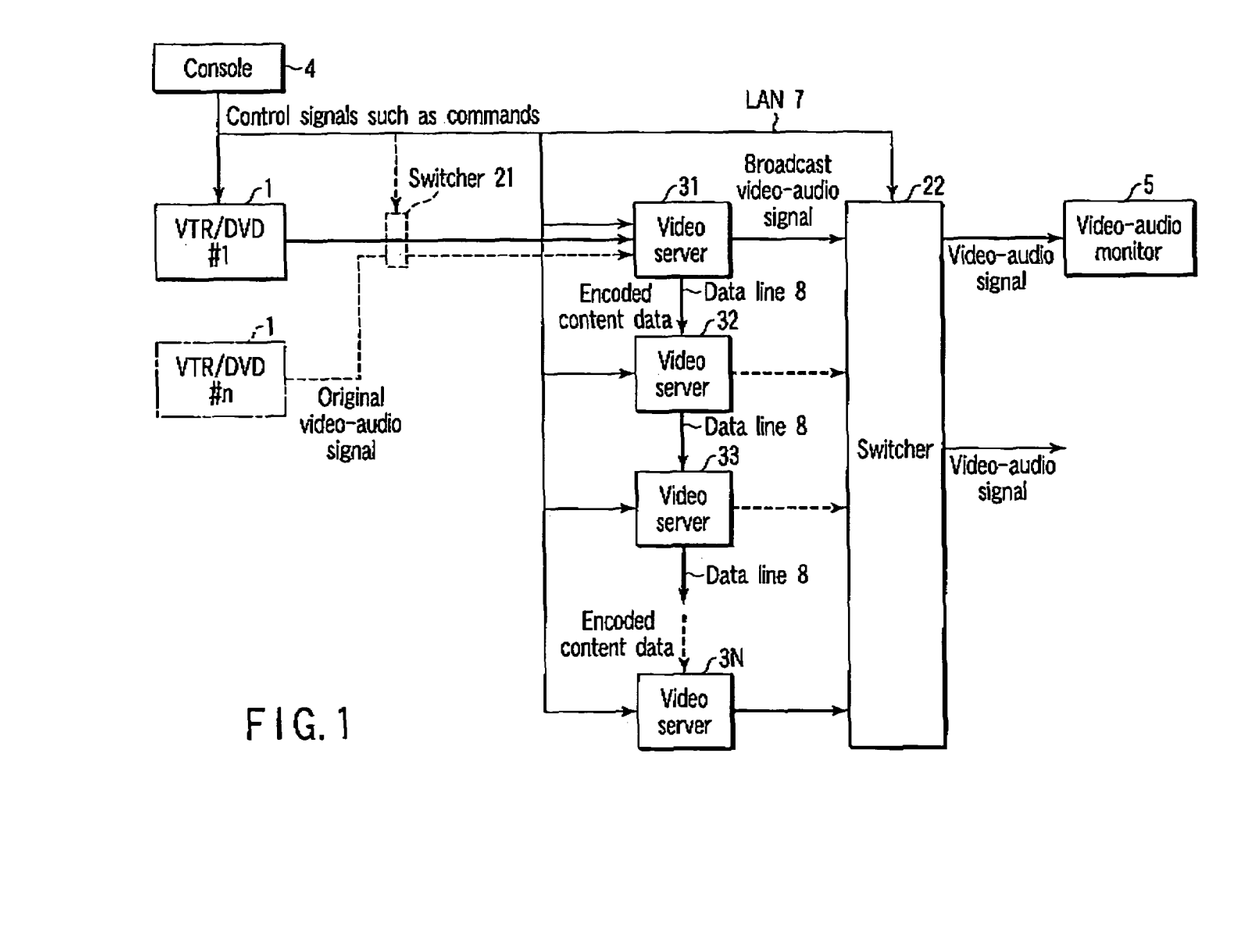
FIG. 1 is a diagram showing the configuration of a first embodiment of a content storage system according to the present invention.

FIG. 1 is a block diagram showing the configuration of a content storage system according to the first embodiment of this invention. As FIG. 1 shows, the system has a VTR/DVD 1, which provides original video-audio signals (content) that will be used in broadcasting programs. Two or more VTR/DVDs (#1 to #n), not one VTR/DVD 1, may be used in some cases. If a plurality of VTR/DVDs are used, the output of any one of the VTR/DVDs can be selected by operating a switcher 21. Note that the VTR/DVD 1 is an example of an original video-audio signal source. The VTR/DVD 1 may be replaced by another type of a signal source, such as a communications apparatus or an electronic apparatus that supplies an original video-audio signal via a network (not shown).

The system comprises first to Nth video servers 31 to 3N (N is 2 or a greater natural number). For simplicity of explanation, it is assumed that the first video server 31 is the acting server and that the other video servers 32 to 3N are reserve servers. The video servers 31 to 3N are essentially identical in configuration. Each video server receives an input video-audio signal, encodes the signal, generating content data and writes (stores) the content data to the internal memory unit. In response to a request for the video-audio signal, the video server reads the content data from the internal memory unit decodes the same back to the video-audio signal and outputs the video-audio signal.

The video servers 31 to 3N are connected in series by a data line 8. The data line 8 is a transmission path that can transmit data at a rate of, for example, gigabits. The data line 8 is used to transmit the encoded content data stored in the first video server 31 to the second video server 32 and store the same, as copied data, in the second server 32. Similarly, the data line 8 is used to transmit the encoded content data stored in the ith video server (i is any one of natural numbers 1 to N) to the (i+1)th video server and store the same, as copied data, in the (i+1)th video server.

The video-audio signal output from the first to Nth video servers 31 to 3N can be selected by operating a switcher 22. The video-audio signal selected by the switcher 22 is output as a broadcast video-audio signal. The signal is supplied to a video-audio monitor 5, too, in accordance with a request. The video-audio monitor 5 is an apparatus that displays the video signal and the audio signal contained in the input video-audio signal and check them for errors, either altogether or independently.

The system mentioned above comprises a console 4. The console 4 receives the operator's inputs for the VTR/DVD 1, switchers 21 and 22 and video servers 31 to 3N. The console 4 then generates control signals such as commands, which correspond to the operator's inputs. The control signals are supplied from the console 4 to the other components of the system via a local-area network (hereinafter referred to as LAN) 7. The control signals control the components, respectively. For example, a control signal supplied to the video servers 31 to 3N controls the storing and reading data into and from the servers 31 to 3N, and a control signal supplied to the switcher 22 makes the switcher 22 select the broadcast video-audio signal output from one of the video servers 31 to 3N and output the same to the video-audio monitor 5.

More specifically, the console 4 is connected by the LAN 7 to the automatic program controller (APC) or the automation system provided in the master apparatus (not shown) that is installed in a broadcasting station. When operated by the operator, the console 4 generates various control commands for playing out programs. The console 4 transmits commands (i.e., control signals) to the VTR/DVD 1, switchers 21 and 22 and video severs 31 to 3N. The console 4 may be a dedicated button pad or switch pad, an input device such as a keyboard, a display device, or a dedicated device having an interface with the LAN 7, though not shown in detail. Alternatively, the console 4 may be an information terminal such as a personal computer or a work station.

The content data obtained by encoding a video-audio signal and stored in any one of the video servers 31 to 3N (hereinafter referred to as encoded content data) is transferred via the data line 8 to the next-stage video sever connected in series. Thus, the encoded content data stored in the video server 31, for example, is transferred via the data line to the video server 32.

The LAN 7 may be a network dedicated to the transmission of control signals in the broadcasting station. Further, the LAN 7 may be replaced by a bus such as GP-IB or a network such as a process-control network. The network need not be a bus-connected one. It may be a set of links that connect devices in one-to-one relation. The VTR/DVD 1, switchers 21 and 22 and video servers 31 to 3N, all connected to the LAN 7, have a signal input/output interface each. The signal input/output interface is connected to the LAN 7.

Figure 2:
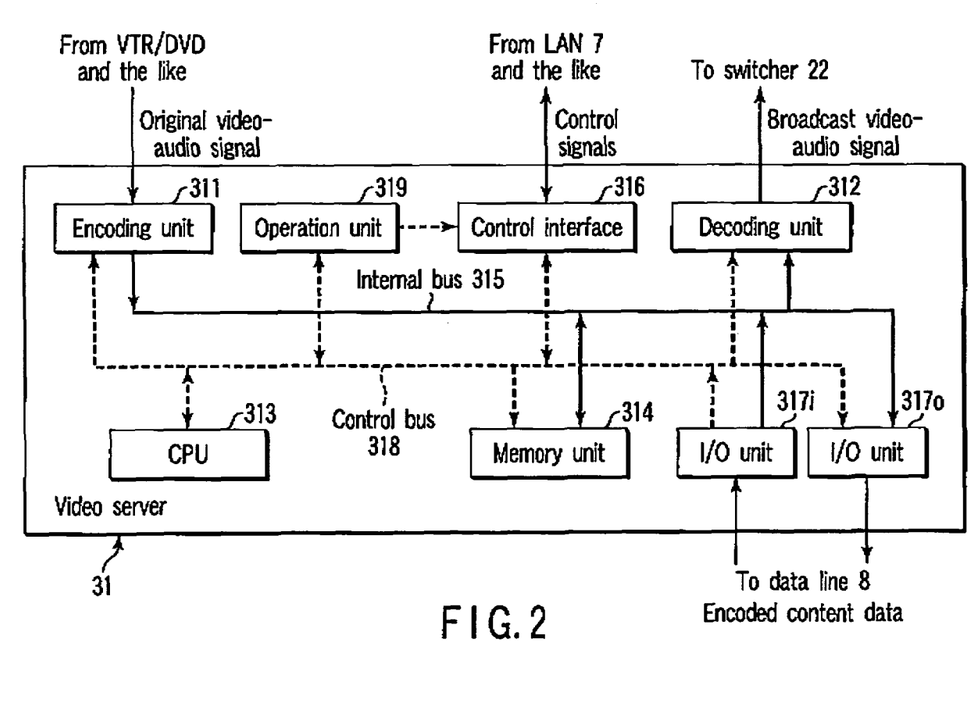
FIG. 2 is a function block diagram of one of the video servers used in the first embodiment.

FIG. 2 is a function block diagram of the video server 31. The other video servers 32 to 3N will not described, because they are identical in configuration to the video server 31.

As shown in FIG. 2, the video server 31 comprises an internal bus 315 and a control bus 318. To the internal bus 315, an encoding unit 311, a decoding unit 312, a memory unit 314, an I/O unit 317i and an I/O unit 37o are connected. The I/O unit 317i is an input interface, and the I/O unit 37o is an output interface. To the control bus 318, an encoding unit 311, a decoding unit 312, a CPU 313, a memory unit 314, a control interface unit 316, control I/O units 317i and 317o, and an operation unit 319 are connected. The control interface unit 316 is connected to the LAN 7 and functions as an input/output interface for control signals.

The control I/O units 317i and 317o, both shown in FIG. 2, may be replaced by a single interface that works as both an input interface and an output interface through timing control. For simplicity of explanation, however, it is assumed that two control interface units are used in the present embodiment.

The video server 3 will be described with reference to FIGS. 1 and 2.

In the content storage system according to this embodiment, the VTR/DVD 1 plays back the original video-audio signal upon receiving a storage command from the console 4 via the LAN 7. The video-audio signal is input to the video server 31. In the video server 31, the original video-audio signal is input to the encoding unit 311. The encoding unit 311 encodes the original video-audio signal to an MPEG signal at encoding speed of 18 Mbps. This encoding is compression encoding. Instead, it may be digital encoding in which data is not compressed or encoding for writing data into the memory unit 314.

The content data obtained by encoding the original video-audio signal is supplied to the memory unit 314 through the internal bus 315 and written (stored) to the memory unit 314. Hitherto, the signal-encoding and the data-writing are a copying process that is repeated in each video server. This is why the data stored in each video server must be previewed to determine whether the data has been correctly copied.

In the present embodiment, the encoded content data is transferred between the video servers 31 to 3N through the data line 8 and is copied when it is input and output through the internal bus 315 in each of the video servers 31 to 3N. In each video server, a storage-start/end command, a command designating the copy-source/copy-destination, a playback command and the like, which are control signal transmitted from the console 4 via the LAN 7, are supplied to the control interface unit 316. In each of the video servers 31 to 3N, the operation unit 319 is, for example, a switch or a dial. The operator may operate the operation unit 319, instead of the console 4, thereby to supply control signals, such as commands, to the control bus 318, either directly or via the control interface unit 316.

The CPU 313 writes or reads the encoded content data to or from the memory unit 314, in accordance with the command input via the control bus 318 and designating the storing, copying or previewing of the data. If a playback command is input to the control interface unit 316, the encoded content data is read from the memory unit 314 and input to the decoding unit 312 through the internal bus 315. The decoding unit 312 decodes the content data to a broadcast video-audio signal. This signal is supplied to the switcher 22. The data played back in the video server 31 is supplied via the switcher 22 to the video-audio monitor 5. Thus, the operator can preview the data on the video-audio monitor 5.

As described above, the video server 31 has the control I/O units 317i and 317o. The control I/O unit 317i receives encoded content data at high speed and supplies the same to the internal bus 315. The control I/O unit 317o receives encoded content data from the internal bus 315 at high speed and outputs the same from the video server 31. When a copy command is supplied from the console 4, the encoded content data stored in the memory unit 314 is read and supplied to the control I/O unit 317i that is provided at the input of the second video server 32. When the video server 32 receives a copy command, the encoded content data received at the control I/O unit 317i is written into the memory unit 314, whereby the data is copied completely.

Figure 3A:
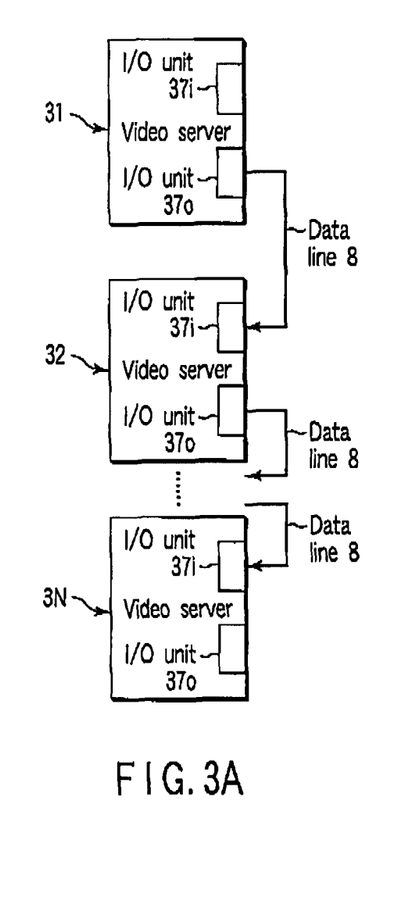
FIGS. 3A and 3B are system diagrams, each showing a specific connection of the data line 8.
Figure 3B:
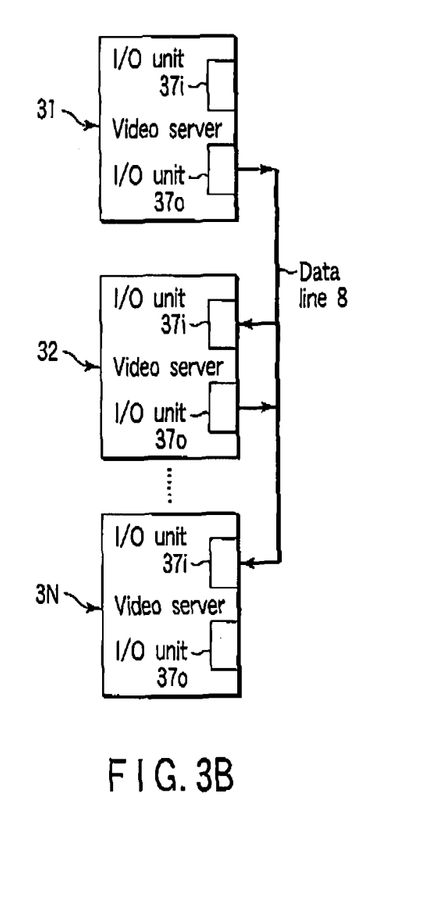

FIGS. 3A and 3B are system diagrams, each showing a specific connection of the data line 8.

More precisely, FIG. 3A is a system diagram showing data lines 8, each achieving the one-to-one link between the ith video server (i is any one of natural numbers 1 to N−1) and the (i+1)th video server, so that data may be transmitted at the rate of gigabits. In this case, the data line 8 connects the video server 3i and the video server 3(i+1). The operator may operate the console 4, generating a command that designates the video server in which data should be copied. This command is supplied to the video servers 31 to 3N. The number of data lines 8 used is (N−1), where N is the number of video servers provided in the system.

FIG. 3B is a system diagram showing data lines 8, to which the input-side I/O unit 37i and output-side I/O unit 37o of each of the video servers 31 to 3N are connected by a common bus. In this case, the operator may operate the console 4, subordinating the address of any copy destination (to which data should be transferred) to the address of the copy source. Hence, the copy destination is logically connected to the copy source in series, though physically connected in parallel.

Figure 4:
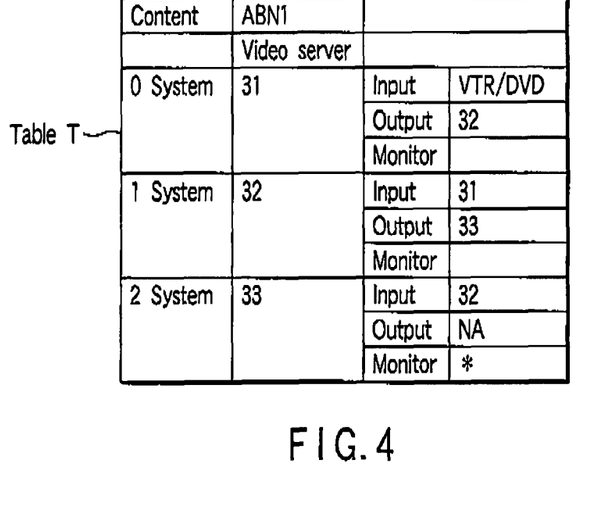
FIG. 4 is a table showing the input-output relation that the video servers have in the first embodiment with respect to a video-audio signal (content signal)

FIG. 4 is a table T showing the input-output relation between the video servers with respect to the video-audio signal.

The operator operates the console 4, designating the encoded content data shown in the table T and inputting the ID number of the video server to which the data should be copied, in the input menu displayed on the display that is provided on the console 4. The data items thus input at the console 4 are input, as commands, from the console 4 to the video servers 31 to 3N and switchers 21 and 22 via the LAN 7. Using these data items, data is written, read, transferred and copied as has been described above.

In each of the video servers 31 to 3N, the address data for transmitting data via the data line 8 and the ID data number of the video server are managed in association. The video server from which a packet should be transmitted via a data line 8 and the video server to which the packet should be transmitted through the data line 8 are determined from the address of the packet.

As seen from FIG. 4, the content item name "ABN1" (symbol) of an original video-audio signal accumulated in the VTR/DVD 1 is recorded in the "content" row. The content item name is common to the VTR/DVD 1 and the video servers 31 to 3N. Strictly speaking, each original video-audio signal has one content item name, e.g., "ABN1-1," before it is encoded, and another content item name, e.g., "ABN1-2," after it has been encoded. That is, the signal is managed under one name before it is encoded, and under another name after it has been encoded. Hereinafter, however, "ABN1" will be used as the content item name of the original video-audio signal, in order not to complicating the description.

The numbers shown in the "0 system" row, "1 system" row, and "2 system" row of the table T shown in FIG. 4 are the serial numbers allocated to the video servers, which are designated as acting server, a reserve server and another reserve server, respectively. Each serial number may correspond to "31," "32," . . . , or "3N." For simplicity, however, it is assumed here that only three video servers 31, 32 and 33 are used for the 0 system, the 1 system and the 2 system, respectively.

The source of the original audio-video signal or encoded content data is recorded in the "input" row. The destination of the original audio-video signal or encoded content data is recorded in the "output" row. The original video-audio signal is input first to the video server 31 from the VTR/DVD 1 and is output from the video server 31 to the video server 32, and then output from the video server 32 to the video server 33.

In FIG. 4, the mark "*" recorded in the "monitor" row for the 2 system means that the video server 33 is the server at the final stage in this case. Therefore, the broadcast video-audio signal generated from the video-audio signal read from the VTR/DVD 1 is output to the video-audio monitor 5. The monitor 5 displays the image represented by the broadcast video-audio signal and generates the sound represented by this signal. To make the monitor 5 display the image represented by the data stored in an intermediate video server 3i and generate the sound represented by this data, it suffices to put mark "*" against the video server 3i.

Figure 5:
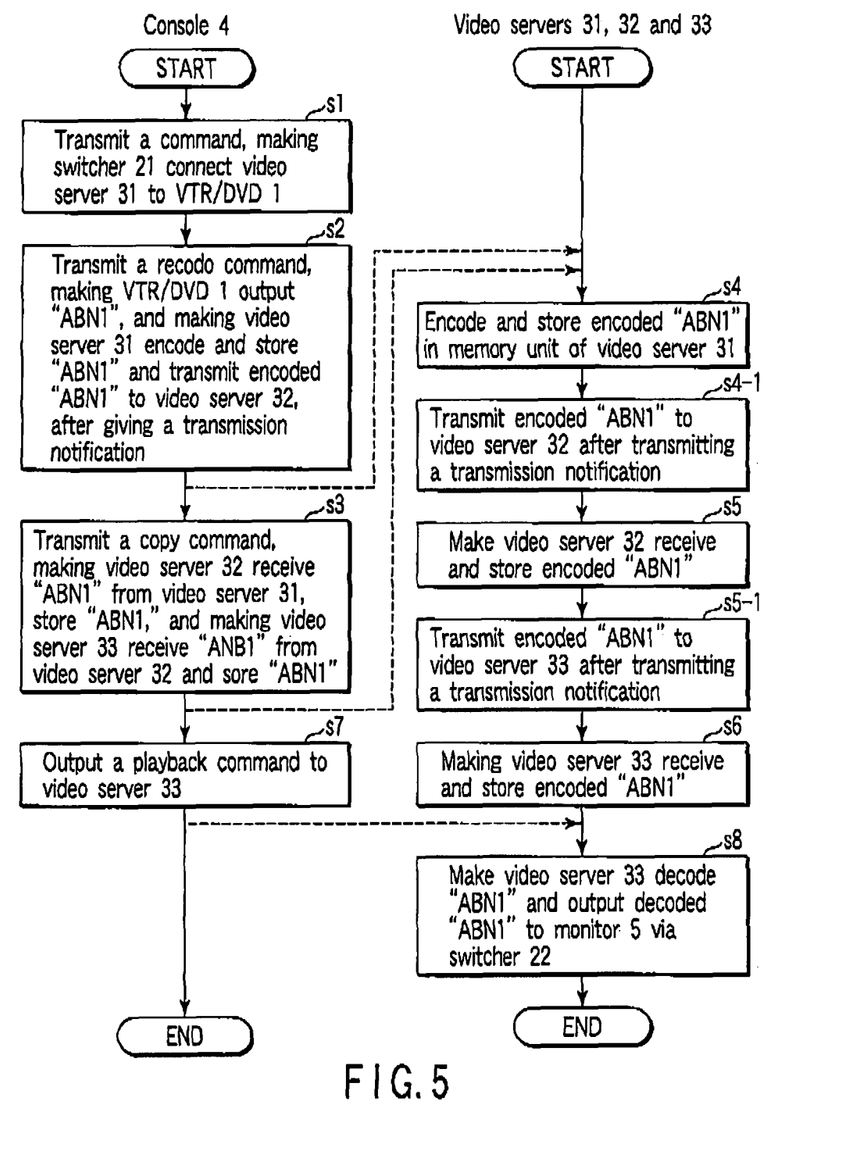
FIG. 5 is a flowchart explaining the commands output to the video servers provided in the first embodiment and a sequence of operations performed in response to the commands.

FIG. 5 is a flowchart explaining the commands output to the three video servers 31 to 33 in the first embodiment and an example of the sequence of operations performed in response to these commands.

Assume that the operator operates the keyboard at the console 4, inputting the data items shown in the table T (FIG. 4) to store the content item "ABN1" and a "GO" command for starting the storing the content item "ABN1." Then, the console 4 generates various commands, which are transmitted to the video servers 31 to 33, VTR/DVD 1 and switchers 21 and 22 via the LAN 7. The video server 31 receives a command instructing that instructs the server 31 should encode and store an original video-audio signal (content item name) and transmit the data stored to the video server 32. The video server 32 receives a command instructing that the sever 32 should receive an encoded file from the video server 31, copy the encoded file and transmit the encoded file to the video server 33. The video server 33 receives a command instructing that the server 33 should receive the encoded file from the video server 32 and copy the encoded file.

In the row for the video server 31, included in the table T, it is described that the content item "ABN1" should be acquired from the VTR/DVD 1 and stored in the video server 31. Therefore, a selection command is transmitted to the switcher 21, instructing that the switcher 21 should connect the video server 31 to the VTR/DVD 1 (Step S1).

The console 4 transmits a command to the VTR/DVD 1 via the LAN 7, making the VTR/DVD 1 output the content item "ABN1." The console 4 then transmits a recode command to the video server 31 via the LAN 7, making the server 31 encode the content item "ABN1," store the encoded content in the memory unit 314, give a transmission notification to the video server 32 and transmit the content item "ABN1" to the video server 32 (Step S2).

Further, the console 4 transmits a first copy command to the video server 32 via the LAN 7, making the server 32 receive the content item "ABN1" from the video server 31, copy the content item "ABN1" in the memory unit 314, give a transmission notification to the video server 33 and transmit the content item "ABN1" to the video server 33. The console 4 transmits a second copy command to the video server 33 via the LAN 7, making the server 33 receive the content item "ABN1" from the video server 32 and copy the content item "ABN1" (Step S3)

In the video server 31, the CPU 313 keeps monitoring the control bus 318, reads the recode command coming through the LAN 7, encode in encoding unit 311 and write the encoded content item "ABN1" from the encoding unit 311 to the memory unit 314 (thus, storing the content data) (Step S4). The video server 31 gives a transmission notification to the video server 32 via the LAN 7 or the data line 8 and transmits the encoded content item "ABN1" to the video server 32 through the data line 8 (Step S4-1).

In the video server 32, the CPU 313 starts monitoring the LAN 7 or the data line 8 when the video server 32 receives the first copy command sent via the LAN 7. After receiving a transmission notification, the video server 32 receives the encoded content item "ABN1" that follows the notification. The encoded content is copied or written into the memory unit 314 (Step S5). The video server 32 then transmits a transmission notification to the video server 33 via the LAN 7 or the data line 8 (Step S5-1).

In the video server 33, the CPU 313 starts monitoring the LAN 7 or the data line 8 when the video server 33 receives the second copy command sent via the LAN 7. After receiving a transmission notification, the video server 33 receives the encoded content item "ABN1" that follows the notification. The encoded content is copied or written into the memory unit 314 (Step S6).

After the encoded content item "ABN1" has been copied in the video server 33, the operator operates the console 4, generating a playback command, which is output to the video server 33 via the LAN 7 (Step S7).

The playback command contains a command that makes the switcher 22 connect the output of the video server 33 to the video-audio monitor 5. Therefore, in the video server 33 that has received the playback command, the encoded content item "ABN1" is read from the memory unit 314 and decoded by the decoding unit 312, and the content data decoded is output to the video-audio monitor 5 through the switcher 22 (Step S8).

The first embodiment of the content storage system may have two video servers only. If this is the case, the system operates without the second video server 32.

Second Embodiment

A second embodiment of the content storage system according to this invention will be described, with reference to FIG. 6. The second embodiment is identical to the first embodiment in terms of system configuration. Therefore, its system configuration will not be described. Only a sequence of operations performed in the second embodiment will be explained, because the sequence differs from the sequence of operations performed in the first embodiment.

Figure 6:
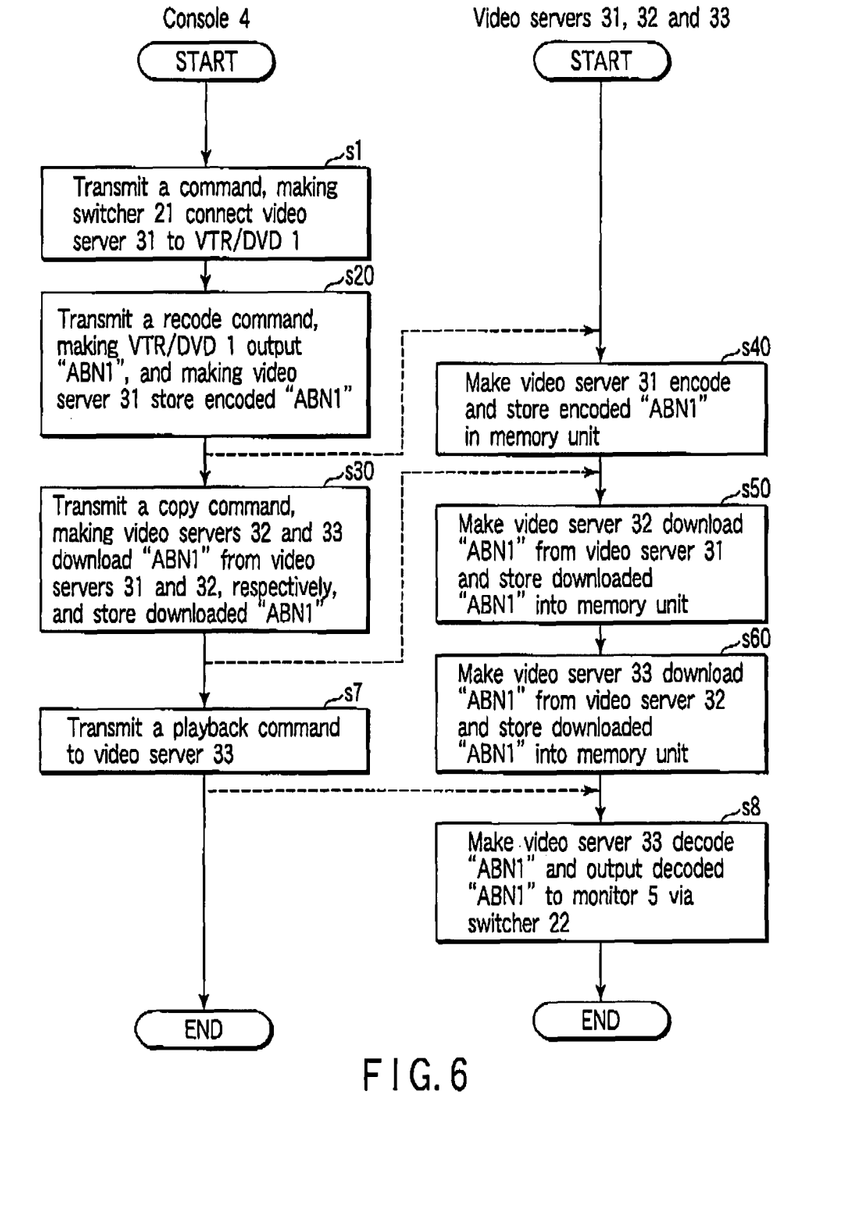
FIG. 6 is a flowchart explaining the second embodiment of the content storage system according to the invention and also explaining an sequence of operations performed in response to the commands.

FIG. 6 is a flowchart explaining the commands output to three video servers 31 to 33 provided in the second embodiment and explaining a sequence of operations performed in response to the commands.

Assume that the operator operates the keyboard at the console 4, inputting the data items shown in the table T (FIG. 4) and a "GO" command for starting the storing data. Then, the console 4 generates three commands, which are transmitted to the video servers 31, 32 and 33, respectively, via the LAN 7. The command transmitted to the video server 31 instructs that the server 31 should encode an original video-audio signal (content item name), store the content data obtained by encoding the signal, read the encoded content data and output the content data read. The command transmitted to the video server 32 instructs that the server 32 should receive the encoded content data from the video server 31, copy or storing this content data, read the content data and output the content data read. The command transmitted to the video server 33 instructs that the server 33 should receive the encoded content data from the video server 32 and copy or storing this content data. The console 4 also generates a playback command and two switching commands. The playback command is transmitted to the VTR/DVD 1 via the LAN 7. The switching commands are transmitted to the switchers 21 and 22, respectively, via the LAN 7.

In the row for the video server 31 (i.e., 0 system), included in the table T, it is described that the content transmitted from the VTR/DVD 1 should be encoded and stored in the video server 31. Therefore, the console 4 transmits a selection command to the switcher 21, instructing that the switcher 21 should connect the video server 31 to the VTR/DVD 1 (Step S1).

Next, a playback command is transmitted the VTR/DVD 1 via the LAN 7 so that the content item "ABN1" may be output to the video server 31, and an recode command is transmitted to the video server 31 via the LAN 7 so that the content item "ABN1" may be encoded and stored in the video server 31 (Step S0).

A first copy command for downloading the content item "ABN1" from the video server 31 is transmitted to the video server 32 via the LAN 7, and a second copy command for downloading the content item "ABN1" from the video server 32 is transmitted to the video server 33 via the LAN 7 (Step S30).

In the video server 31, the CPU 313 keeps monitoring the control bus 318, reads the recode command coming through the LAN 7 and encodes in encoding unit 311 and writes the encoded content item "ABN1" from the encoding unit 311 to the memory unit 314, thus, storing the content data (Step S40).

In the video server 32, the CPU 313 starts monitoring the internal timer (not shown) when it receives a copy command coming through the LAN 7. Upon lapse of a preset time (for example, t1) within which the content item "ABN1" should be stored in the video server 31, or at the timing of staring the copying of the content item "ABN1" in response to the copy command, the video server 32 accesses the video server 31 via the LAN 7. Then, the encoded content item "ABN1" is downloaded from the memory unit 314 of the video server 31 into the video server 32 via the data line 8. In the video server 32, the encoded content item "ABN1" is written into the memory unit 314 through the internal bus 315, thus copying the encoded content item "ABN1" (Step S50). If the encoded content item "ABN1" has not been completely stored in the video server 31, the video server 32 will access the video server 31 again upon lapse of the above-mentioned preset time in order to copy the encoded content item "ABN1."

In the video sever 33, the CPU 313 starts monitoring the internal timer (not shown) upon receiving a copy command coming through the LAN 7. Upon lapse of a preset time (for example, 2×t1 or more) within which the content item "ABN1" should be stored in the video server 31, or at the timing of staring the copying of the content item "ABN1" in response to the copy command, the video server 32 accesses the video server 31 via the LAN 7. Then, the encoded content item "ABN1" is downloaded from the memory unit 314 of the video server 32 into the video server 32 via the data line 8. In the video server 33, the encoded content item "ABN1" is written into the memory unit 314 through the internal bus 315, thus copying the encoded content item "ABN1" (Step S60).

If the encoded content item "ABN1" has not been completely stored in the video server 32, the video server 33 will access the video server 32 again upon lapse of the preset time in order to copy the encoded content item "ABN1." In the video server 33, when the encoded content is copied completely, a copy-completion notification may be transmitted to the console 4 via the LAN 7 and displayed on, for example, a display.

After the encoded content is completely copied in the video server 33, the operator operates the console 4, which generates a playback command. The playback command is output to the video server 33 via the LAN 7 (Step S7). This playback command contains a command that makes the switcher 22 connect the output of the video server 33 to the video-audio monitor 5.

Therefore, in the video server 33 that has received the playback command, the content item "ABN1" is read from the memory unit 314 and decoded by the decoding unit 312, and the content data decoded is output to the video-audio monitor 5 through the switcher 22 (Step S8).

In the video servers 32 and 33 of the first and second embodiments described above, the video-audio signal is not input to the encoding unit 311, and the encoded content data is copied in the form of digital data and transferred to the next-stage video server through the data line 8. If any error develops in the copying process in the next-stage video server (e.g., the server 32), the video-audio signal output from the final-stage video server 33 will represent an image or sound that is abnormal in quality. Thus, whether errors have developed in the copying process can be determined by previewing the video-audio signal at the video-audio monitor 5. It can be determined in which video server the copying error has occurred, only if the switcher 33 is operated, thereby supplying the outputs of the video servers 31 to 33 to the video-audio monitor 5 one after another and then previewing them one by one.

As described above, the error control is performed before and after the copying digital data and during the data transfer. The probability of recording error-containing content data in the final-stage video server 33 is therefore very low. In view of this, the encoded content data accumulated in the final-stage video server 33 is supplied to the video-audio monitor 5 through the switcher 22 and is previewed at the video-audio monitor 5. If the image and sound played back from the encoded content data are almost identical in quality to the original image and sound represented by the original video-audio signal, it is confirmed, by a single preview, that the encoded content data is stored, in normal form, in all video servers connected in series.

If errors are found in the content data stored in the final-stage video server, a command is input from the console 4 through the switcher 22 to the immediately upstream video server 3 (e.g., the video server 32 in the case described above). The content data output from this video server is previewed, determining whether normal data has been played back. Thus, time can be saved in confirming where the copy error has developed.

With the content storage system according to the present invention, the operator needs to perform previewing only a few times. This greatly decreases the working load on the operator.

Third Embodiment

A third embodiment of the content storage system according to this invention will be described, with reference to FIGS. 7 to 9. The third embodiment is identical to the first embodiment in terms of system configuration. Therefore, its system configuration will not be described. Only a sequence of operations performed in the second embodiment will be explained, because the sequence differs from the sequence of operations performed in the first embodiment.

The time required to store any content data is equal to the time required to broadcast the corresponding program. So is the time required to preview the content data. Nonetheless, the content data can be read while it is being written, or it can be stored and previewed at the same time. The time required to store and review the data can therefore be the same as the time required to broadcast the corresponding program. In this case, the use efficiency of the devices and apparatuses can be raised in the content storage system.

That is, the video servers 31 to 3N of this embodiment of the content storage system have a memory unit 314 each, from which data can be read and output while the data is being written on it. The memory unit 314 may be a magnetic disk, a semiconductor memory, or any other recording medium. The early technique of reading and outputting data is magnetic-tape recording, in which a recording head and a playback head are used. For any recording medium, a recording-playback method is now available, in which data can be read while the same data is being written.

Here, a method called "catch-up playback," which uses a semiconductor memory and can perform copying and previewing almost at the same time, will be explained.

Figure 7:
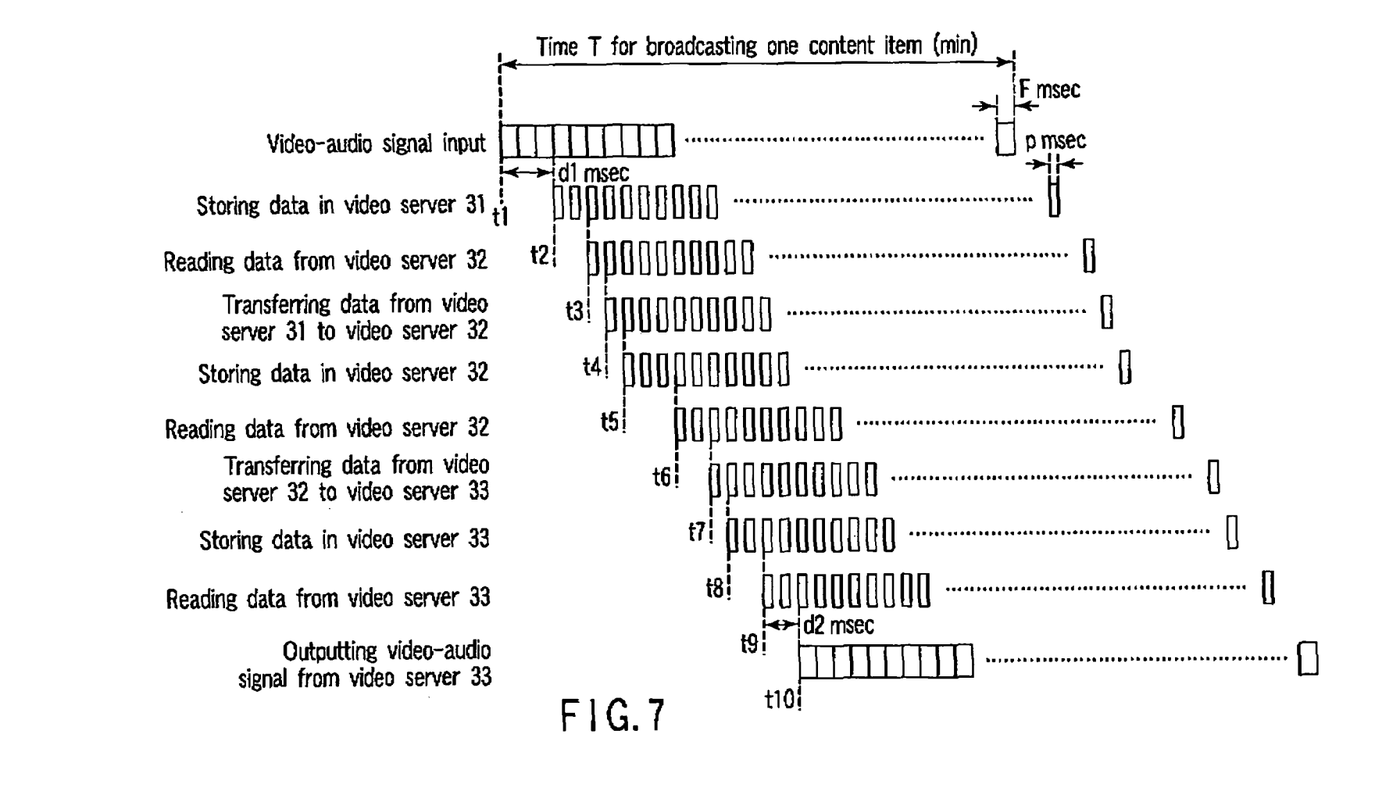
FIG. 7 is a chart explaining the timing of inputting and outputting signals to and from the servers provided in a third embodiment of the content storage system according to the present invention.

FIG. 7 is a chart explaining the timing of inputting and outputting signals to and from the video servers 31 to 33.

Assume that one content item (one broadcast program) has duration of T minutes. The video-audio signal for the content is encoded in units of frames. Each frame has duration of F [msec]. To accomplish the catch-up playback, a one-frame of the video signal is supplied from one video server to the next-stage video server within time p [msec] shorter than the one-frame duration F [msec]. Times t1 to t10, which are shown in FIG. 7 and will be explained, are operation timings. In the NTSC television system, the one-frame duration is about 33 [msec].

A video-audio signal is input from the VTR/DVD 1 to the video server 31 (t1). Upon lapse of time d1 [msec] for encoding about three frames, the video-audio signal is written into the memory unit 314 as encoded content data (t2). The reading of the encoded content data from the memory unit 314 is started immediately (several milliseconds to tens of milliseconds later) (t3). Then, the transfer of the encoded content data to the next-stage video server 32 is started (t4).

In the video server 32, the encoded content data received is written into the memory unit 314 in the same way as in the video server 31 (t5). Immediately after the data is so written (several milliseconds to tens of milliseconds later), it is read from the memory unit 314 (t6). The data thus read is transferred to the video server 33 (t7). In the video server 33, the same process is performed as in the video server 32 (t8). However, the encoded content data read from the memory unit 314 (t9) is not transferred to the next-stage video server. Instead, the encoded content data is decoded and output to the video-audio monitor 5 (t10). At this point, the video server 3N outputs the encoded content data within the decoding time d2 [msec].

The reading start time (t2), during which encode content data is read out from the memory unit 314, was indicated as being within a period ranging from several milliseconds to tens of milliseconds. Depending upon the recording method in use, however, the reading start time (t2) can be several seconds.

If the process sequence described above is performed, the time between the inputting of the video-audio signal from the VTR/DVD 1 and the displaying of the image represented by the signal is long enough in units of seconds. The encoded video data is stored and previewed almost at the same time even if this data is copied and stored in three video servers.

Hence, the two processes, i.e., storing and previewing, can be performed at a time, spending almost the same time as the storing time or previewing time.

Figure 8:
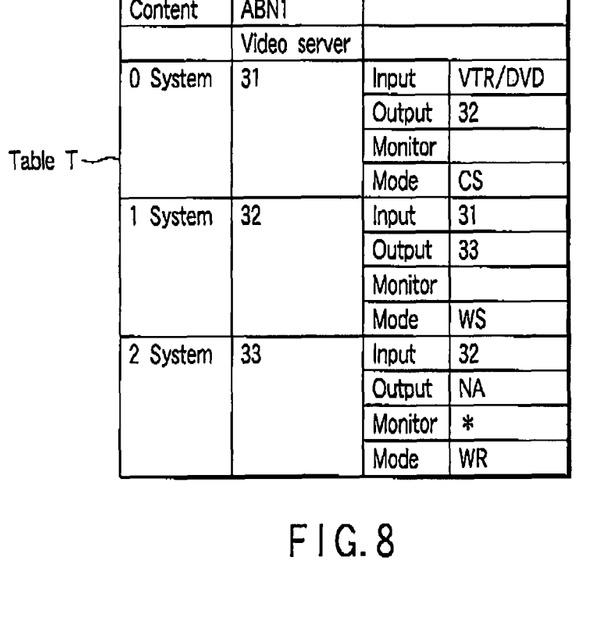
FIG. 8 is a table showing the input-output relation that the video servers have in the third embodiment with respect to a video-audio signal (content signal)

FIG. 8 is a table T showing the input-output relation that the video servers have in the third embodiment with respect to a video-audio signal (content signal). The items shown in this table T will not be explained, because they are similar to those shown in FIG. 4.

This table T is characterized in the mode rows. The mode recorded in each of these rows is a combination of four operation symbols, i.e., encoding-storing "C," copying-storing "W," transfer "S" and playback (outputting of encoded data) "R." That is, the mode is "C" if the video servers 31 to 3N perform the encoding-storing only. The mode is "CS" if the video servers 31 to 3N read and transfer the data while writing and storing the data. The mode is "WS" if the video servers 31 to 3N transfer the data while copying and storing the data (or reading the data while writing it). The mode is "WR" if the video servers 31 to 3N decode and output the data while copying and storing the data (or reading the data while writing it). The video server 31 is dedicated to "CS," the video server 32 to "WR," and the video server 33 to "RW." The mode is "CR" if the data should be decoded and output while being stored.

The console 4 generates commands in accordance with the content item name, the source and destination from which and to which each video server receives and outputs the content data. The commands thus generated are transmitted to the video servers via the LAN 7.

Figure 9:
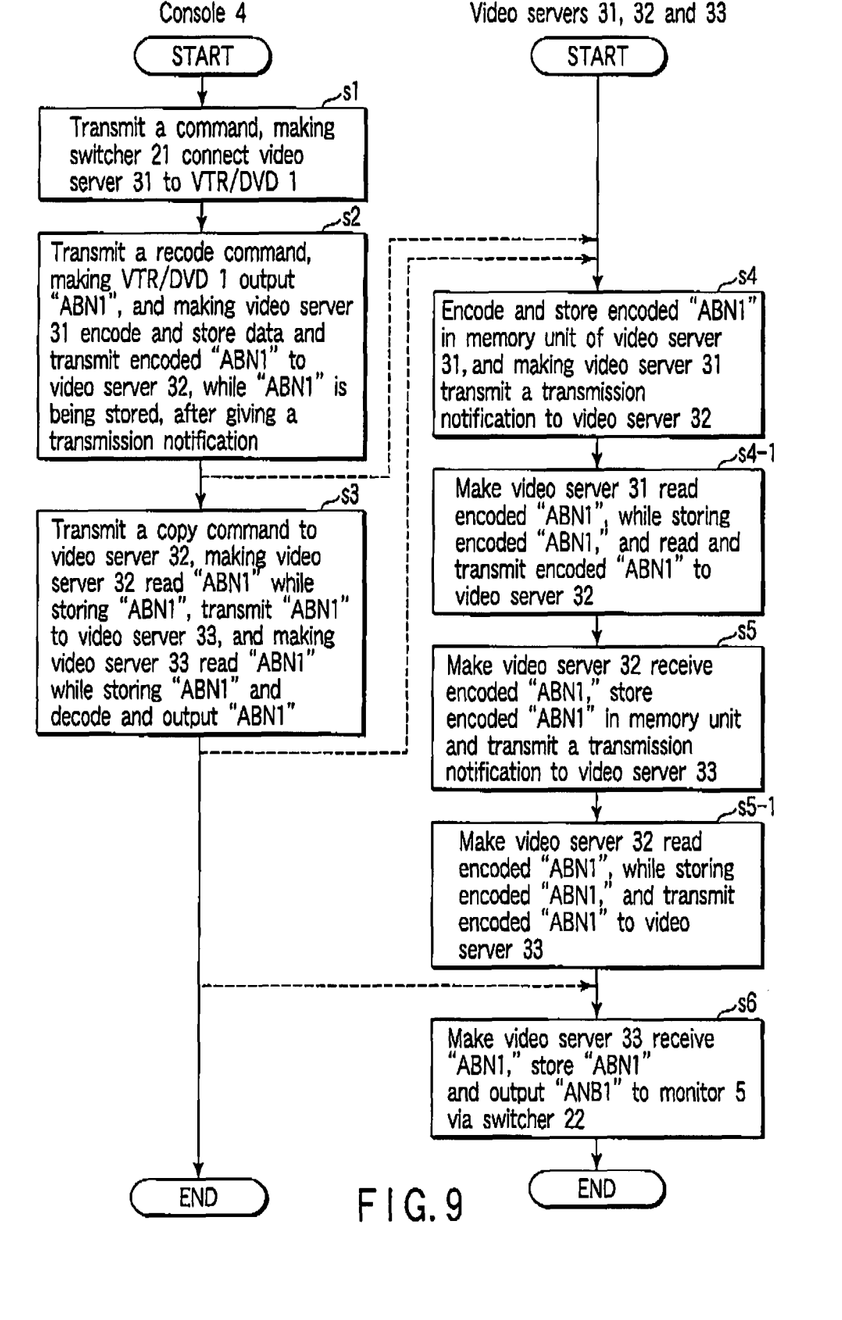
FIG. 9 is a flowchart explaining the commands output to the video servers provided in the third embodiment and a sequence of operations performed in response to the commands.

FIG. 9 is a flowchart explaining the commands output to the video servers provided in the third embodiment and a sequence of operations performed in response to the commands. Note that FIG. 7 shows the timing of reading data while the data is being written, in each server which has been in standby state shortly before and which has received the command.

Assume that the operator operates the console 4, inputting the data items shown in the table T (FIG. 8) about content item name "ABN1" and a "GO" command for starting the storing data. Then, the console 4 generates three commands, which are transmitted to the video servers 31, 32 and 33, respectively, via the LAN 7. The command transmitted to the video server 31 instructs that the server 31 should encode and store an original video-audio signal (content item name) and should transmit the signal to the video server 32. The command transmitted to the video server 32 instructs that the server 32 should receive the encoded content data from the video server 31, should copy this content data and should transmit the data to the video server 33. The command transmitted to the video server 33 instructs that the server 33 should receive the encoded content data from the video server 32 and should copy or store this content data. The console 4 also generates commands, which are transmitted to the VTR/DVD 1 and the switchers 21 and 22 via the LAN 7, so that each content item may be transmitted from the VTR/DVD 1 and the switchers 21 and 22.

In the row for the video server 31 (i.e., 0 system), included in the table T, it is described that the content transmitted from the VTR/DVD 1 should be encoded and stored in the video server 31. Therefore, the console 4 transmits a selection command to the switcher 21, instructing that the switcher 21 should connect the video server 31 to the VTR/DVD 1 (Step S101).

The console 4 transmits a command to the VTR/DVD 1 via the LAN 7, making the VTR/DVD 1 output the content item "ABN1." The console 4 also transmits a command to the video server 31 via the LAN 7, making the server 31 encode the content item "ABN1" in the encoding unit 311 and write the encoded content to the memory unit 314, and give a transmission notification to the video server 32. The console 4 transmits a copy command to the video server 32 via the LAN 7, making the server 31 reading and transmitting the content item "ABN1" to the sever 32, while this data is being written (Step S102).

Further, the console 4 transmits a first copy command to the video server 32 via the LAN 7, making the server 32 receive the content item "ABN1" from the video server 31, copy the content item "ABN1" in the memory unit 314, give a transmission notification to the video server 33 when the data-writing is started, and read and transmit the content item "ABN1" to the video server 33, while the content item "ABN1" is being written. The console 4 transmits a second copy command to the video server 33 via the LAN 7, making the server 33 receive the content item "ABN1" from the video server 32, copy the content item "ABN1" in the memory unit 314, read the content item "ABN1," while the content item "ABN1" is being written, and decode and output the content item "ABN1" (Step S103).

In the video server 31, the CPU 313 keeps monitoring the control bus 318, reads the recode command coming through the LAN 7 and encoded and writes the encoded content item "ABN1" from the encoding unit 311 to the memory unit 314, thus, storing the content data. The server 31 then transmits a transmission-notification signal to the video server 32 via the LAN 7 or the data line 8, notifying the start of data transmission (Step S104).

Subsequently, the CPU 313 of the video server 31 reads the encoded data from the memory unit 314, while the encoded data is being written into the memory unit 314. The encoded data thus read is transmitted to the video server 32 via the data line 8 (Step S104-1).

In the video server 32, the CPU 313 starts monitoring the LAN 7 or the data line 8 when it receives the first copy command coming through the LAN 7. Upon receiving the transmission-notification signal, the video server 32 receives the encoded data "ABN1" coming through the data line 8. The data is copied in the memory unit 314. The video server 32 also transmits a transmission-notification signal to the video server 33 via the LAN 7 or the data line 8, notifying the start of data transmission (Step S105).

Subsequently, the CPU 313 of the video server 32 reads the encoded data from the memory unit 314, while the encoded data is being written into the memory unit 314. The encoded data thus read is transmitted to the video server 33 via the data line 8 (Step S105-1).

In the video server 33, the CPU 313 starts monitoring the LAN 7 or the data line 8 when it receives the second copy command coming through the LAN 7. Upon receiving the transmission-notification signal, the video server 33 receives the encoded data "ABN1" coming through the data line 8. The data is copied or written into the memory unit 314. The data is read from the memory 341 and decoded by the decoding unit 312. The data decoded is output to the video-audio monitor 5 through the switcher 22 (Step S106).

The present embodiment of the content storage system may have two video servers only. If this is the case, the system operates without the second video server 32.

In the video servers 32 and 33, no video-audio signals are input to the As described above, the encoding unit 311. Instead, the encoded content data is copied in the form of digital data and merely transferred to the next-stage video server through the data line 8. If any error develops in the copying process in the next-stage video server (e.g., the server 32), the video-audio signal output from the final-stage video server 33 will represent an image or sound that is abnormal in quality.

Nevertheless, the probability of recording error-containing content data in the final-stage video server 33 is very low because the error control is performed before and after the copying digital data and during the data transfer. In view of this, the encoded content data accumulated in the final-stage video server 33 is supplied to the video-audio monitor 5 through the switcher 22 and is previewed at the video-audio monitor 5. If the image and sound played back from the encoded content data are almost identical in quality to the original image and sound played back by the original video-audio signal, a single preview can confirm that the encoded content data is stored, in normal form, in all video servers connected in series. Furthermore, the time required for storing the data, including the preview time, is only a few seconds longer than the time required for outputting the original video-audio signal. This is because the data is previewed while it is being recorded.

If any error is found in the output data from the final-stage video server 33 while it is being previewed, a command is input from the console 4 through the switcher 22 to the immediately upstream video server (e.g., the video server 32 in the case described above). The content data output from this video server is previewed, determining whether normal data has been played back. Thus, time can be saved in confirming where the copy error has developed.

As has been described, in the content storage system according to the present invention, the content stored in all storage apparatuses can be previewed at a time. Hence, the greater the number of video servers provided for storing broadcast video-audio signals, and the longer the broadcasting time of each video-audio signal, the more greatly can the preview time be decreased. This much reduces the working load on the operator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content storage system comprising:
    first to Nth storage apparatuses (N is 2 or a greater natural number), each of which is configured to store one or more encoded content items generated from encoding one or more original audio-video signals containing at least any one of a video signal and an audio signal;
    a data line which connects the first to Nth storage apparatuses in series;
    a monitor apparatus configured to preview the one or more original audio-video signals decoded from the one or more encoded content items stored in each of the first to Nth storage apparatuses; and
    a control apparatus which controls the first to Nth storage apparatuses and the monitor apparatus,
    wherein each of the first to Nth storage apparatuses comprises:
        an encoding unit which receives and encodes the one or more original audio-video signals to generate the one or more encoded content items;
        a memory unit into which the one or more encoded content items encoded by the encoding unit are written;
        a decoding unit which decodes the one or more encoded content items, read from the memory unit, back to the one or more original audio-video signals; and
        an input-output unit which receives the one or more original audio-video signals from a source, writes the one or more encoded content items to the memory unit, reads the one or more encoded content items from the memory unit and outputs the one or more encoded content items to another storage apparatus for storage or outputs the decoded one or more original audio-video signals for preview,
    wherein
    the input-output units of the first to Nth storage apparatuses are connected in series by the data line,
    the control apparatus causes the first storage apparatus to receive a first one of the original audio-video signals and causes the memory unit of the first storage apparatus to store a first one of the encoded content items generated by the encoding unit of the first storage apparatus,
    the control apparatus causes the ith storage apparatus (i is any one of natural numbers 1 to N−1) to output the first encoded content item from the memory unit of the ith storage apparatus to the input-output unit thereof,
    the control apparatus causes the (i+1)th storage apparatus to receive the first encoded content item from the ith storage apparatus by the data line, and to write the first encoded content item to the memory unit of the (i+1)th storage apparatus, thereby copying and storing the first encoded content item,
    the control apparatus causes the Nth storage apparatus to read the first encoded content item from the memory unit of the Nth storage apparatus and causes the decoding unit of the Nth storage apparatus to decode the first encoded content item back to the first original audio-video signal,
    the control apparatus causes the Nth storage apparatus to output the decoded first original audio-video signal to the monitor apparatus,
    the control apparatus causes the monitor apparatus to preview the first original audio-video signal output from the Nth storage apparatus,
    the control apparatus detects an indication that the first original audio-video signal output from the Nth storage apparatus contains one or more errors, and
    the control apparatus commands the ith storage apparatus to decode and output the first encoded content item stored in the ith storage apparatus, and causes the monitor apparatus to preview the first original audio-video signal output from the ith storage apparatus.

2. The content storage system according to claim 1, wherein the first to Nth storage apparatuses have a function of reading the first encoded content item, while writing the first encoded content item, and the control apparatus causes the ith storage apparatus to read the first encoded content item from the memory unit and output the first encoded content item outside, while writing the first encoded content item into the memory unit, and causes the (i+1)th storage apparatus to receive the first encoded content item from the ith storage apparatus and write the first encoded content item to the memory unit.

3. The content storage system according to claim 1, wherein the first to Nth storage apparatuses have an output interface and an input interface, and the output interface of the ith storage apparatus is connected to the input interface of the of the (i+1)th storage apparatus by the data line.

4. The content storage system according to claim 1, wherein the input-output units of the first to Nth storage apparatuses have an input interface and an output interface, and the output interface of the ith storage apparatus is connected to the input interface of the of the (i+1)th storage apparatus by the data line.

5. The content storage system according to claim 1, further comprising a switcher which selects any one of the decoded outputs of the first to Nth storage apparatuses and supplies the decoded output, which has been selected, to the monitor apparatus, and wherein the control apparatus causes the switcher to select the decoded output of any storage apparatus designated.

6. The content storage system according to claim 1, wherein the control apparatus transmits a storage command to the first storage apparatus, instructing that the first storage apparatus encode the first original audio-video signal and store the first encoded content item in the memory unit, give a transmission notification to the second storage apparatus after storing the first encoded content item, read the first encoded content item from the memory unit and transmit the first encoded content item to the second storage apparatus; the control apparatus transmits a copy command to the (i+1)th storage apparatus, instructing that the (i+1)th storage apparatus receive the first encoded content item transmitted from the ith storage apparatus, write the first encoded content item to the memory unit, thus copying the first encoded content item, give a transmission notification to a (i+2)th storage apparatus, if any, after the first encoded content item has been copied, read the first encoded content item from the memory unit and transmit the first encoded content item to the (i+2)th storage apparatus; and the first to Nth storage apparatuses perform processes in accordance with commands transmitted from the control apparatus.

7. The content storage system according to claim 1, wherein the control apparatus transmits a storage command to the first storage apparatus, instructing that the first storage apparatus encode the first original audio-video signal and write the first encoded content item to the memory unit, thus storing the first encoded content item; the control apparatus transmits a copy command to the (i+1)th storage apparatus, instructing that the (i+1)th storage apparatus download the first encoded content item from the ith storage apparatus and write the first encoded content item to the memory unit, thus copying the first encoded content item; and the first to Nth storage apparatuses perform processes in accordance with commands transmitted from the control apparatus.

8. The content storage system according to claim 2, wherein the control apparatus transmits a storage command to the first storage apparatus, instructing that the first storage apparatus encode the first original audio-video signal, write the first encoded content item to the memory unit, thus storing the first encoded content item, give a transmission notification to the second storage apparatus after the storing of the first encoded content item has been started, read the first encoded content item from the memory unit, while the first encoded content item is being written into the memory unit; the control apparatus transmits a copy command to the (i+1)th storage apparatus, instructing that the (i+1)th storage apparatus receive the first encoded content item from the ith storage apparatus, write the first encoded content item to the memory unit, thus copying the first encoded content item, give a transmission notification to a (i+1)th storage apparatus, if any, after the storing of the first encoded content item has been started, read the first encoded content item from the memory unit, while the first encoded content item is being written into the memory unit, and transmit the first encoded content item to the (i+2)th storage apparatus; and the first to Nth storage apparatuses perform processes in accordance with commands transmitted from the control apparatus.

9. The content storage system according to claim 2, wherein the control apparatus transmits a storage command to the first storage apparatus, instructing that the first storage apparatus encode the first original audio-video signal and write the first encoded content item to the memory unit, thus storing the first encoded content item; the control apparatus transmits a copy command to the (i+1)th storage apparatus, instructing that the (i+1)th storage apparatus download the first encoded content item from the ith storage apparatus and write the first encoded content item to the memory unit, thus copying the first encoded content item; and the first to Nth storage apparatuses perform processes in accordance with commands transmitted from the control apparatus.

10. A method of controlling storage of content in a content storage system comprising first to Nth storage apparatuses (N is 2 or a greater natural number), each of which is configured to store one or more encoded content items generated from encoding one or more original audio-video signals containing at least any one of a video signal and an audio signal, a data line which connects the first to Nth storage apparatuses in series, and a monitor apparatus configured to preview the one or more original audio-video signals decoded from the one or more encoded content items stored in each of the first to Nth storage apparatuses, each of the first to Nth storage apparatuses comprising an encoding unit which receives and encodes the one or more original audio-video signals to generate the one or more encoded content items, a memory unit into which the one or more encoded content items obtained by the encoding unit are written, a decoding unit which decodes the one or more encoded content items read from the memory unit, back to the one or more original audio-video signals, and an input-output unit which receives the one or more original audio-video signals from a source, writes the one or more encoded content items to the memory unit, reads the one or more encoded content items from the memory unit and outputs the one or more encoded content items to another storage apparatus for storage or outputs the decoded one or more original audio-video signals for preview, the input-output units of the first to Nth storage apparatuses being connected in series by the data line, the method comprising:
causing the first storage apparatus to receive a first one of the original audio-video signals and store a first one of the encoded content items generated by the encoding unit in the memory unit;
causing the ith storage apparatus (i is any one of natural numbers 1 to N−1) to output the first encoded content item from the memory unit to the input-output unit;
causing the (i+1)th storage apparatus to receive, at the input-output unit, the first encoded content item from the ith storage apparatus by the data line, and to write the first encoded content item to the memory unit, thereby copying and storing the first encoded content item;
causing the Nth storage apparatus to read the first encoded content item from the memory unit and causing the decoding unit to decode the first encoded content item back to the first original audio-video signal,
causing the Nth storage apparatus to output the decoded first original audio-video signal to the monitor apparatus,
causing the monitor apparatus to preview the first original audio-video signal output from the Nth storage apparatus, detecting an indication that the first original audio-video signal output from the Nth storage apparatus contains one or more errors, and commanding the ith storage apparatus to decode and output the first encoded content item stored on the ith storage apparatus, and causing the monitor apparatus to preview the first original audio-video signal output from the ith storage apparatus.

11. The method according to claim 10, wherein the first to Nth storage apparatuses have a function of reading the first encoded content item, while writing the first encoded content item, and the ith storage apparatus is caused to read the first encoded content item and output the first encoded content item, while writing the first encoded content item, and the (i+1)th storage apparatus is caused to receive the first encoded content item from the ith storage apparatus and to write the first encoded content item to the memory unit.

12. The method according to claim 10, wherein, to make the first to Nth storage apparatuses perform processes in accordance with commands, a storage command is transmitted to the first storage apparatus, instructing that the first storage apparatus encode and store the first original audio-video signal in the memory unit, thus storing the first encoded content item, give a transmission notification to the second storage apparatus after the first encoded content item has been stored and read the first encoded content item from the memory unit and transmit the first encoded content item to the second storage apparatus; and a copy command is transmitted to the (i+1)th storage apparatus, instructing that the (i+1)th storage apparatus receive the first encoded content item from the ith storage apparatus, write to the memory unit, thus copying the first encoded content item, give a transmission notification to a (i+2)th storage apparatus, if any, after the first encoded content item has been copied, read the first encoded content item from the memory unit and transmit the first encoded content item to the (i+2)th storage apparatus.

13. The method according to claim 10, wherein, to make the first to Nth storage apparatuses perform processes in accordance with commands, a storage command is transmitted to the first storage apparatus, instructing that the first storage apparatus encode the first original audio-video signal and write the first encoded content item to the memory unit, thus storing the first encoded content item; and a copy command is transmitted to the (i+1)th storage apparatus, instructing that the (i+1)th storage apparatus download the first encoded content item from the memory unit of the ith storage apparatus and write the first encoded content item to the memory unit.

14. The method according to claim 11, wherein, to make the first to Nth storage apparatuses perform processes in accordance with commands, a storage command is transmitted to the first storage apparatus, instructing that the first storage apparatus encode the first original audio-video signal, write the first encoded content item to the memory unit, thus storing the first encoded content item, give a transmission notification to the second storage apparatus after the storing of the first encoded content item has been started, sequentially read the first encoded content item from the memory unit and transmit the first encoded content item to the second storage apparatus; and a copy command is transmitted to the (i+1)th storage apparatus, instructing that the (i+1)th storage apparatus receive the first encoded content item from the ith storage apparatus, write the first encoded content item to the memory unit, thus copying the first encoded content item, give a transmission notification to an (i+2)th storage apparatus, if any, after the copying of the first encoded content item has been started, sequentially read the first encoded content item from the memory unit and transmit the first encoded content item to the (i+2)th storage apparatus.

15. The method according to claim 11, wherein, to make the first to Nth storage apparatuses perform processes in accordance with commands, a storage command is transmitted to the first storage apparatus, instructing that the first storage apparatus encode the first original audio-video signal to generate the first encoded content item and write the first encoded content item to the memory unit, thus storing the first encoded content item; and a copy command is transmitted to the (i+1)th storage apparatus, instructing that the (i+1)th storage apparatus sequentially download and write the first encoded content item to the memory unit, while the first encoded content item is being read from the memory unit of the ith storage apparatus.

* * * * *